March 29, 1932.  E. J. FISH  1,851,304
LUBRICATING MEANS
Filed Jan. 3, 1927
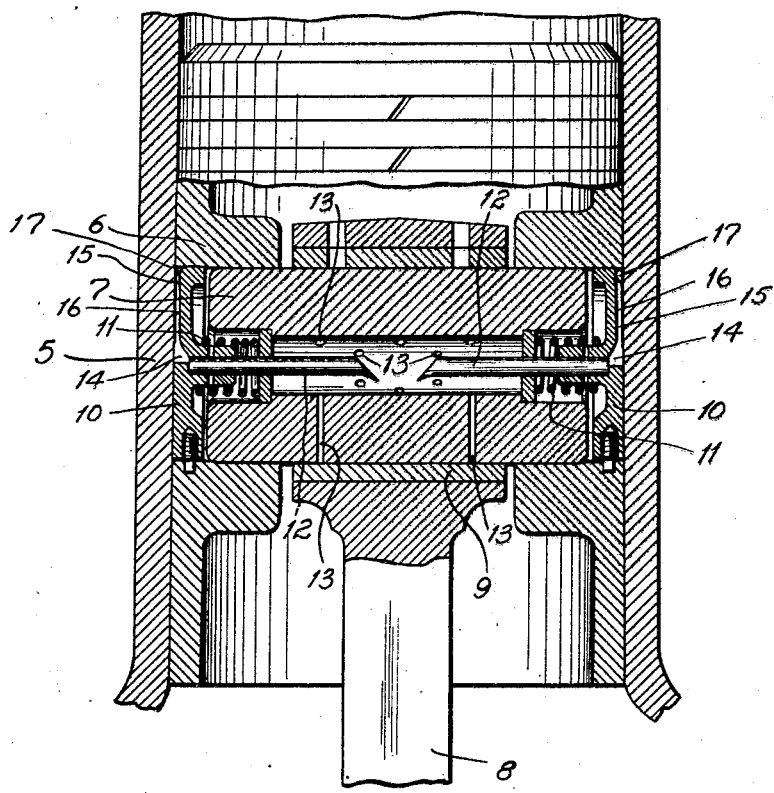
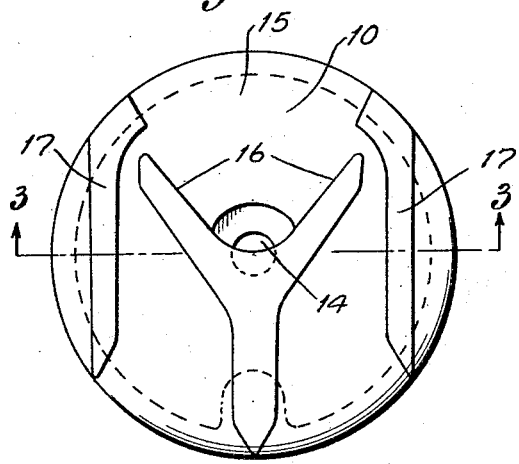
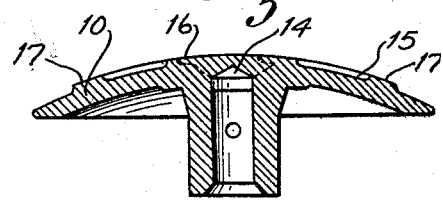
INVENTOR
ELBERT J. FISH.
BY Roy M. Eilers
ATTORNEYS Patented Mar. 29, 1932

1,851,304

UNITED STATES PATENT OFFICE

ELBERT J. FISH, OF BELOIT, WISCONSIN, ASSIGNOR TO FAIRBANKS, MORSE & CO., OF CHICAGO, ILLINOIS, A CORPORATION OF ILLINOIS

LUBRICATING MEANS

Application filed January 3, 1927. Serial No. 158,610.

This invention relates to improvements in lubricating means and more specifically to means for lubricating bearings located in the reciprocating parts of various mechanisms, for example, the piston pin bearing in an internal combustion engine.

The object of this invention is to provide a lubricating means of the sort described in which the movement of the reciprocating mechanism is utilized for the purpose of directing a flow of oil directly to the parts to be lubricated.

A further object of the invention is to provide lubricating means of the type described which are simple, dependable, and positive in operation, economical to construct and which will provide for the ample lubrication of parts which ordinarily, it is not practical to connect directly with the force feed lubricating system.

Further objects and advantages of my invention will appear from the drawings and the following description thereof.

The device herein described and the novelty involved in its disposition and arrangement of parts constitute certain modifications of the subject matter of Patent No. 1,772,461 to Charles B. Jahnke. The apparatus disclosed in this copending application was designed for engines of a certain type; the device herein described is better suited for use in engines of another sort.

Although my invention consists largely in the construction and arrangement of parts hereinafter described and particularly pointed out in the claims, yet I do not limit my invention to the precise form or construction of parts shown or the several parts thereof, inasmuch as various alterations may be made without changing the scope of my invention.

In the drawings wherein the same reference characters designate the same elements throughout, Fig. 1 shows a sectional elevation of a piston pin bearing assembly embodying an approved form of my device. Fig. 2 shows an end elevation of the scraper, and clearly indicates an approved form of the scraper face adjacent the cylinder wall. Fig. 3 is a sectional view of the scraper, taken along line 3—3 in Fig. 2.

Referring by numerals to the drawings, 5 indicates a cylinder wall of the usual type, the cylinder having therein a piston of any conventional form. At 6 is shown the usual piston boss. A piston pin is shown at 7 and connected thereto a connecting rod 8, journaled on a bushing 9 which constitutes the usual connecting rod or piston pin bushing. The piston pin or wrist pin 7 is preferably recessed, as shown, by drilling centrally therethrough, the ends of the central aperture being slightly enlarged, as shown. The hollow piston pin 7 is preferably drilled at a plurality of points transversely at its axis to provide a series of oil ducts 13 which serve the purpose of conducting oil from the interior of the hollow piston pin 7 to the bushing 9. At 10 I have indicated an approved form of oil scraper which may be located at one end of the piston pin 7 or at both ends thereof, as shown. Obviously one or more such scrapers may be disposed at other points around the piston and adjacent the cylinder wall 5. I prefer to use two of such scrapers disposed as shown in Fig. 1. Immediately behind each oil scraper 10 is located a spring 11 adapted to press the scraper firmly against the surface of the cylinder wall 5 for the purpose of collecting lubricant therefrom. The face of the scraper 10 is provided, in the example shown, with a central oil receiving recess 14 and oil is preferably transferred therefrom by means of a pipe 12 leading to the interior of the hollow pin 7. For ease of manufacture and assembly I have shown pipe 12 as a short section of tubing of suitable form inserted in the scraper 10. Obviously pipe 12 may be dispensed with by extending the hollow portion of scraper 10 farther toward the interior of the piston pin. 15 indicates the upper or outer side of the scraper, i. e., the side of the scraper nearest the head of the cylinder.

The oil collecting means proper is found on the face of the scraper, which, it will be seen, is adapted to collect and feed lubricant to the wrist pin when travelling in either direction. A V or Y shaped member 16 is used in the example shown to collect oil during the upward travel of the piston and consists of a pair of divergent arms which have the effect of directing the oil immediately to the central oil receiving recess 14 and under a slight pressure to force it therefrom through pipe 12 to the interior of the wrist pin 7. The V or Y shaped member is preferably located centrally with respect to the face of the scraper 10. Near the margins of the scraper face I prefer to locate a pair of members 17 substantially as shown in the drawings. Members 17 serve to gather oil on the downward stroke of the piston by directing it toward a relieved area embraced by the two arms of the portion 16, thence through recess 14 and pipe 12, as described above. Members 16 and 17 are preferably formed on the scraper 10 on the face thereof adjacent the cylinder wall and are preferably integral with the scraper, the portions 16 and 17 merely projecting slightly from the remainder of this face of the scraper. Obviously these members may assume a great variety of forms and may consist of separate pieces of metal secured to the face of the scraper. It will be seen, however, that the arrangement illustrated provides a scraper which will positively direct the oil in its path toward the interior of the wrist pin during either the inward or outward movement of the piston.

The operation of the device described above will be readily apparent from the description of parts. It presupposes a suitable film of oil on the cylinder wall in the path of travel of the oil scraper. This oil may be fed to the cylinder wall in any suitable manner as through an oil duct from some suitable type of lubricator, (not shown).

As the piston reciprocates in the cylinder the scraper will remove a certain amount of oil from the cylinder wall, and this will be forced or projected into the central oil receiving recess 14 in the scraper. It will immediately be carried therefrom by the pipe 12 to the interior of the hollow wrist pin 7, thence through ducts 13 to the wrist pin bushing or bearing.

The lubricating device herein described and illustrated may be applied equally well to either a vertical or horizontal engine. It is obvious that the device is also applicable to many other types of reciprocating mechanisms, such as cross heads and the like, wherever it is possible to dispose the scraper adjacent a surface supplied with lubricant.

I claim:

1. In an engine having a cylinder, a piston therein and a bearing in said piston, a lubricating means for said bearing comprising a lubricant collector carried by said piston and a conveying means between said collector and said bearing and relatively inclined projecting elements carried by said collector and arranged in groups, the groups of said elements adapted to operate one at a time, to collect lubricant on alternate strokes of said piston.

2. In an engine, a cylinder, a piston, a piston pin lubricator comprising a member having a face portion conforming substantially to a portion of the cylinder wall and adapted to be supplied with lubricant therefrom, said member including lubricant distributing means, and being carried by said piston pin, and a plurality of lubricant-impelling projections disposed in angular relation on the face of said member, and adapted to collect and to deliver lubricant to said distributing means during the travel of said piston in each direction, and irrespective of piston position.

3. In a wrist pin oiling device adapted to be supplied with oil from a lubricated wall surface, the combination of a wrist pin, a bearing therefor, and oil supply and collecting means adapted to remove oil from said lubricated surface, an oil directing means associated with said collecting means and disposed in operative relation thereto, said supply and collecting means including a scraper having its wall-contacting surface formed of ribs, disposed angularly with respect to each other, and adapted to operate to accumulate and direct oil to said wrist pin, the motion of said wrist pin in each direction relative to said lubricated surface.

4. A wrist pin oiling device comprising in combination a cylinder, a piston, scraper carried by said piston adjacent to the cylinder wall, said scraper having a plurality of ridges extending from its face, certain of said ridges arranged in relatively inclined relation, and adapted to remove oil from a wall of said cylinder and to direct said oil toward said wrist pin, said scraper being resiliently retained adjacent a wall of said cylinder and adapted to remove oil therefrom substantially throughout relative movement in each direction between said piston and said cylinder.

5. In an engine having a cylinder, a piston, a wrist pin and a wrist pin bearing carried by said piston, a wrist pin oiling device comprising in combination, a scraper at each end of said wrist pin yieldingly retained against the wall of said cylinder and adapted to collect oil therefrom whenever said piston is in motion, each of said scrapers being provided on the surfaces adjacent the walls of said cylinder, with a plurality of projections adapted to remove oil from said wall and to direct it toward the center of said scraper face, said wrist pin being recessed to receive oil collected by said scraper and having oil ducts between said recess and said bearing.

ELBERT J. FISH.